(12) United States Patent
Blakely et al.

(10) Patent No.: US 11,788,210 B1
(45) Date of Patent: Oct. 17, 2023

(54) ATHLETIC APPAREL

(71) Applicant: Under Armour, Inc., Baltimore, MD (US)

(72) Inventors: Kyle Blakely, Baltimore, MD (US); Randall Harward, Baltimore, MD (US)

(73) Assignee: Under Armour, Inc., Baltimore, MD (US)

( * ) Notice: Subject to any disclaimer, the term of this patent is extended or adjusted under 35 U.S.C. 154(b) by 960 days.

(21) Appl. No.: 16/566,691

(22) Filed: Sep. 10, 2019

Related U.S. Application Data

(60) Provisional application No. 62/729,026, filed on Sep. 10, 2018.

(51) Int. Cl.
*B41M 1/10* (2006.01)
*C09D 11/30* (2014.01)
(Continued)

(52) U.S. Cl.
CPC ............ *D01D 5/253* (2013.01); *B41J 3/4078* (2013.01); *B41M 5/0047* (2013.01); *B41M 5/0064* (2013.01); *B41M 5/0088* (2013.01); *D02G 3/045* (2013.01); *D02G 3/22* (2013.01); *D04B 1/16* (2013.01); *D04B 1/18* (2013.01); *D04B 1/24* (2013.01); *D06M 11/36* (2013.01); *D06M 15/19* (2013.01); *D06M 15/233* (2013.01); *D06M 15/37* (2013.01); *D06M 15/507* (2013.01); *D06M 15/564* (2013.01);
(Continued)

(58) Field of Classification Search
CPC ......... B29C 2793/009; B29C 2795/007; B29L 2031/4842; B41J 3/4078; B41M 1/10; B41M 5/0047; B41M 5/0064; B41M 5/0088; C09D 11/30; C09D 11/38; D01D 5/08; D01D 5/24; D01D 5/253; D01D 5/26; D01G 1/04; D02G 3/045; D02G 3/22; D03D 15/283; D04H 1/435; D10B 2331/04; D10B 2501/04
USPC .............. 264/103, 132, 143, 177.13, 177.14; 2/115; 19/0.3; 57/2, 253, 255; 66/171; 101/153, 155, 157, 170; 139/426 R; 347/100
See application file for complete search history.

(56) References Cited

U.S. PATENT DOCUMENTS 2,077,078 A 4/1937 Taylor et al.
3,058,290 A * 10/1962 Gibbins ................. D03D 15/37
(Continued)

FOREIGN PATENT DOCUMENTS

AU    2011245379 B2    11/2011
CN    103832040 A  *  6/2014
(Continued)

OTHER PUBLICATIONS

Translation of CN-103832040-A (published on Jun. 4, 2014).*

*Primary Examiner* — Leo B Tentoni
(74) *Attorney, Agent, or Firm* — Edell, Shapiro & Finnan, LLC

(57) ABSTRACT

A fabric material includes a plurality of synthetic yarns, the yarns including staple fibers having a range of denier values. The polyester staple fibers have deniers ranging from about 0.5 denier per filament to about 2.0 denier per filament. Additionally, more than 50% of the staple fibers present in the fabric possess a length of greater than 1 inch.

15 Claims, 3 Drawing Sheets

(51) Int. Cl.
*C09D 11/38* (2014.01)
*D01D 5/08* (2006.01)
*D01D 5/24* (2006.01)
*D01D 5/26* (2006.01)
*D01G 1/04* (2006.01)
*D03D 15/283* (2021.01)
*D04H 1/435* (2012.01)
*D01D 5/253* (2006.01)
*D06M 15/233* (2006.01)
*D02G 3/22* (2006.01)
*D06M 15/19* (2006.01)
*D06M 15/564* (2006.01)
*D04B 1/16* (2006.01)
*D04B 1/18* (2006.01)
*D06M 15/507* (2006.01)
*D06P 5/00* (2006.01)
*D06M 11/36* (2006.01)
*D06M 15/37* (2006.01)
*D04B 1/24* (2006.01)
*D02G 3/04* (2006.01)
*B41J 3/407* (2006.01)
*B41M 5/00* (2006.01)
*A41B 1/08* (2006.01)
*D02G 3/36* (2006.01)
*B29L 31/48* (2006.01)

(52) U.S. Cl.
CPC ............... *D06P 5/001* (2013.01); *A41B 1/08* (2013.01); *B29C 2793/009* (2013.01); *B29C 2795/007* (2013.01); *B29L 2031/4842* (2013.01); *D02G 3/36* (2013.01); *D10B 2331/04* (2013.01); *D10B 2331/10* (2013.01); *D10B 2501/00* (2013.01); *D10B 2501/04* (2013.01)

(56) References Cited

U.S. PATENT DOCUMENTS

| | | |
|---|---|---|
| 4,569,264 A | 2/1986 | Van Doorn et al. |
| 8,513,146 B2 | 8/2013 | Hietpas et al. |
| 10,196,763 B2 | 2/2019 | Debnath et al. |
| 2002/0071951 A1* | 6/2002 | Hernandez ............... D04H 1/56 264/143 X |
| 2013/0216810 A1* | 8/2013 | Hines .................. D03D 15/283 442/302 |
| 2019/0127143 A1* | 5/2019 | Ovitt ..................... A01N 59/16 |
| 2019/0233982 A1 | 8/2019 | Usher, Jr. |

FOREIGN PATENT DOCUMENTS

| | | |
|---|---|---|
| EP | 0666095 A1 | 8/1995 |
| EP | 1738003 B1 | 12/2012 |
| JP | 2007247127 A | 9/2007 |
| JP | 5735844 B2 | 6/2015 |

\* cited by examiner

ATHLETIC APPAREL

CROSS REFERENCE TO RELATED APPLICATIONS

The present application is a nonprovisional of U.S. application Ser. No. 62/729,026, the disclosure of which is incorporated by reference in its entirety.

FIELD OF THE INVENTION

The present invention is directed toward an article of apparel and, in particular, to apparel formed from a synthetic textile.

BACKGROUND OF THE INVENTION

In general, athletic apparel is typically formed of a fabric that is either woven or knitted from yarns formed from individual fibers (joined together, e.g., via spinning). Natural fiber such as cotton is often utilized to form yarn incorporated into garments such as shirts. Cotton yarn is generally softer than synthetic yarn, increasing wearer comfort upon contact with the skin. Cotton yarn, however, absorbs moisture and loses its insulating properties when wet. Thus, as a wearer of apparel formed of cotton textile begins to sweat, the moisture becomes trapped within the textile, adding weight, increasing dry time and causing wearer discomfort. Textile formed of synthetic yarn, in contrast, does not hold onto moisture. Apparel made of synthetic yarns transfers moisture away from the skin and dries faster than its cotton-containing counterpart. It does not, however, have the soft hand characteristics of cotton fabric. Thus, it would be desirable to provide apparel formed of synthetic textile that possesses the hand characteristics of cotton textile.

BRIEF SUMMARY OF THE INVENTION

An article of apparel includes a textile formed of synthetic yarns. The synthetic yarns are formed of synthetic fibers possessing a predetermined combination of features, including fiber length, denier and/or cross section. In addition, the concentration of fibers possessing each feature may be maintained within set ranges, when present. The above and still further features and advantages of the present invention will become apparent upon consideration of the following detailed description of specific embodiments thereof.

BRIEF DESCRIPTION OF THE DRAWINGS

Like reference numerals have been used to identify like elements throughout this disclosure.

DETAILED DESCRIPTION OF THE INVENTION

Figure 1:
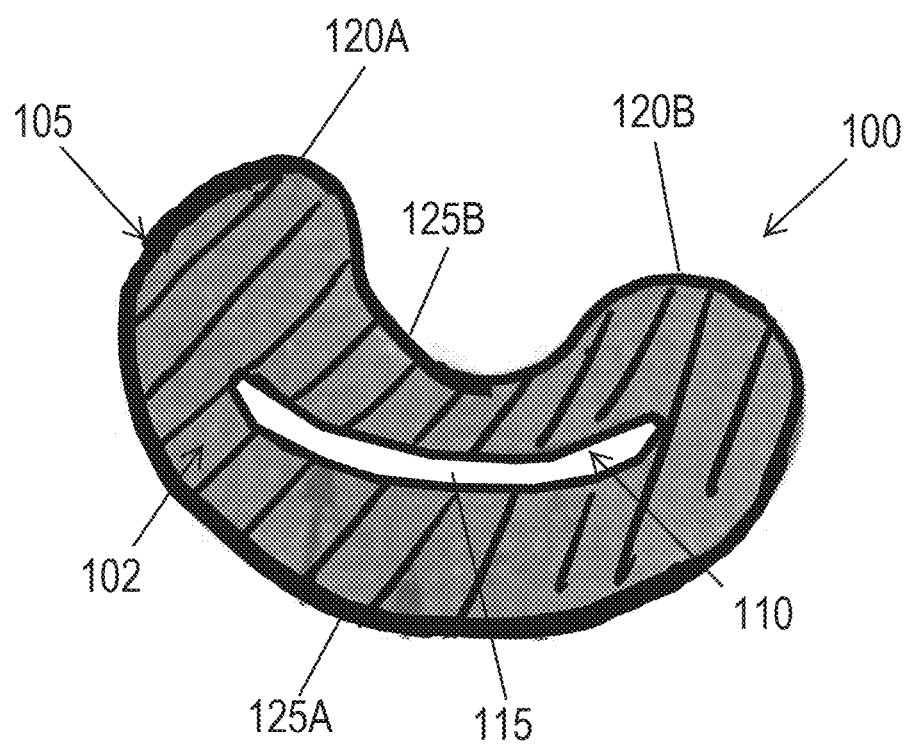
FIG. 1 illustrates a cross-sectional view of a synthetic fiber in accordance with an embodiment of the invention.

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). In addition, the phrase "at least one of A and B" means that either A or B is present or that both A and B are present.

The terms "comprising," "including," "having," and the like, as used with respect to embodiments of the present disclosure, are synonymous.

In accordance with the invention, it has been determined that synthetic fibers and/or yarns and, in particular, polyester fibers and/or yarns, can be formed to have certain physical characteristics which, when combined to form a textile or fabric structure (e.g., a knit, woven or nonwoven fabric material), yield a fabric structure having physical properties or characteristics which simulate, mimic or resemble a fabric structure formed from cotton fibers.

Synthetic polymer fibers are those formed of polymers not found in nature (i.e., polymers that are not considered natural polymers such cellulose, alginate, rubber, and starch). Synthetic polymers include acrylic, aramid, nylon, olefin, polyester, and elastane. Polyester is a manufactured fiber formed from long-chain synthetic polymer consisting of at least 85% the ester of a substituted aromatic carboxylic acid, including (but not limited to) substituted terephthalate units and para-substituted hydroxybenzoate units.

In accordance with an embodiment of the invention, an article of apparel includes a textile or fabric formed of a synthetic yarn such as of polyester (e.g., polyethylene terephthalate), with the fibers having suitable dimensions present in suitable amounts as described herein so as to provide a luxurious hand and feel to the fabric material.

There are a number of control factors useful when forming a synthetic fiber that enhances the feel and other physical properties of the resulting textile or fabric. Control factors include: fiber cross section; fiber thickness or denier; and/or fiber length. The fiber cross section and denier can be controlled during the extrusion process used to form the fibers, while fiber length can be controlled utilizing suitable cutting mechanisms and equipment. Fibers can also be formed having different deniers (as measured in DPF, or denier per filament) as well as different lengths by controlling the fiber formation process as described herein.

Fiber Length and Length Distribution

A filament is a long strand of indeterminate length. Accordingly, in order to form the yarn, the filament must be divided or cut into smaller segments called fibers. For example, as each individual filament is extruded, each filament may be cut via a cutter to its desired length. Alternatively, filaments may be collated together (into tow), and then cut via a cutter to form fibers. Regardless of the approach, and as discussed in greater detail below, the resulting fibers are combined and then spun (twisted together) into yarn. The yarn is then mechanically manipulated (e.g., knit or woven) into a textile which is subsequently formed into an article of apparel.

The cutting length of the synthetic filaments is controlled such that the resulting fibers are classified as staple fibers. Staple fibers are strands of definite, typically short lengths (e.g., less than eight inches). In an embodiment, the synthetic fibers are staple fibers possessing lengths of from about 0.25 inch to about 2.00 inches.

A variety of fiber lengths may be cut and then combined such that fiber lengths are present in the yarn in specific concentrations. In an embodiment, fibers possessing a length of 1.00 inch or less constitute less than 50% of the total fibers within the yarn, while fibers possessing a length of greater than 1.00 inch constitute greater than 50% of the total fibers within the yarn. In a further embodiment, the length distribution includes four distinct length ranges, with fibers possessing a length of 0.75 inches or less is present in an amount of 5%-15%, fibers possessing a length of from greater than 0.75 inches to 1.00 inch are present in an amount of 15% to 25%; fibers possessing a length of from greater than 1.00 inch to 1.25 inches are present in an amount of 25% to 30%; and fibers possessing a length of from greater than 1.25 inches to 2.00 inches are present in an amount of 35% to 45%.

Filament/Fiber Cross Section

As noted above, the filaments 100 are formed via spinning, in which a polymer fluid (e.g., a polymer in a molten state or in solution) is forced through the orifices in a metallic plate called a spinneret at a controlled rate. The orifices can be formed into various shapes, resulting in filaments (and thus fibers) with the desired cross-section. The solidified filaments are drawn-off by rotating rolls and wound onto bobbins. Spinning processes include melt spinning, wet spinning, dry spinning, reaction spinning and gel spinning.

The filaments (and thus the fibers) may possess a cross section having a circular shape or an irregular shape (including polygonal, oval-shaped, bowtie-shaped, kidney-shaped, or other shapes with multiple lobes). Referring to FIG. 1, in an embodiment, the filament 100 possesses an irregular, "C" or "kidney" shape. As shown, the filament 100 includes a generally arcuate body 102 with a generally continuous outer wall 105 and a generally continuous inner wall 110 defining a central opening or shaft 115. A first bulbous arm or end portion 120A opposes a second bulbous arm or end portion 120B. A longer curved portion 125A extends between the bulbous end portions 120A, 120B along one side of the filament. Similarly, a shorter curved portion 125B extends between the bulbous end portions along the other side of the filament.

In an embodiment, fibers that possess an irregular, cross-sectional shape (e.g., a kidney shape) represent greater than 50% of the fibers in the yarn. By way of example, 75% or greater of the fibers within the yarn possess an irregular cross-sectional shape or even 90% or greater of the fibers possessing an irregular, cross-sectional shape. The remainder of the fibers possess a regular shape or an irregular shape other than the kidney shape (e.g., an oval, polygon, etc.).

Fiber Denier and Denier Distribution

Denier is a weight-per-unit-length measure of any linear material. A lower number represents a finer size and a higher number represents a coarser size. The denier per filament (dpf), then, is the denier of an individual staple fiber. In an embodiment, the denier per filament of the fibers is controlled within a range of from about 0.5 dpf to about 2.0 dpf (e.g., from about 1.0 to about 1.5).

In an embodiment, the resulting yarn may include a range of denier values. In an embodiment, the yarn includes low (fine) denier value of 0.95 dpf to 1.05 dpf (e.g., 1.0 dpf); an intermediate denier value of 1.15 dpf to 1.25 dpf (e.g., 1.2 dpf); and a high (coarse) denier value of 1.30 dpf to 1.70 dpf (e.g., 1.5 dpf). The mass density and/or thickness of the synthetic fibers (and of the synthetic filaments) can be varied independently of the fiber length and/or dependent upon the fiber length. For example, the fibers in the different groups of fiber lengths as set forth in Table 1 can also vary in denier per filament (dpf), where the dpf can be varied for fibers in a range from about 0.5 to about 2.0 (e.g., from about 1.0 to about 1.5). In other words, each group of fibers of a set length can vary in thickness and/or denier.

In an embodiment, the intermediate denier value fibers are present in the highest concentration/amount (i.e., the fibers represent the largest percentage of fibers within the yarn, based on the total number of fibers), constituting over 50% of the yarn. The low denier value fibers and the high denier value fibers are present in amounts less than the amount of high denier value fibers. Additionally, the high denier value fibers are present in an amount equal to or less than that of the low denier value fibers. By way of specific example, the intermediate denier value fibers represent 55%-65% (e.g., 60%) of the total fibers within the yarn; the low denier value fibers represent 15%-35% (e.g., 20% or 30%) of the total fibers within the yarn; and the high denier value fibers represent 5-25% (e.g., 10% or 20%) of the total fibers in the yarn.

Figure 2:
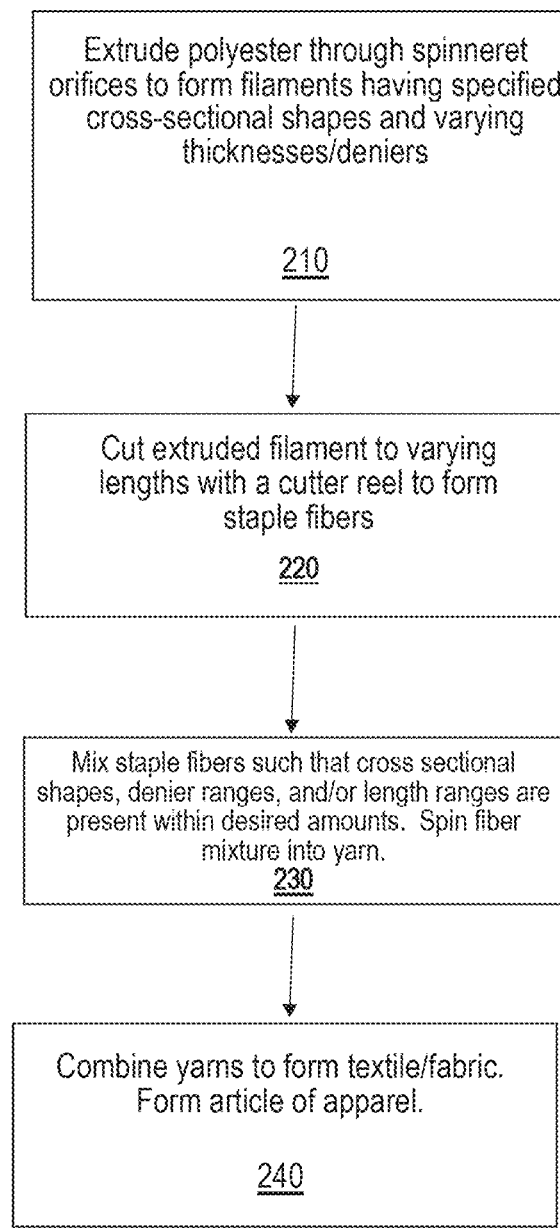
FIG. 2 is a flowchart describing an example process for forming a textile including the synthetic fibers in accordance with an embodiment of the invention.

An exemplary process of forming of the polyester yarn having cotton-like properties is explained with reference to FIG. 2. At 210, an extrusion process can be used to form polyester fibers having desired cross-sectional shapes and desired thicknesses or deniers. For example, a melt spun process can be used in which polyester material (e.g., solid polyester pellets or chips) can be melted and then delivered to a spinneret. The spinneret includes outlet orifices having suitably dimensioned shapes that control the cross-sectional shapes and thicknesses (so as to control the deniers) of the filaments formed from molten polymer extruded from the orifices. A spinneret can be configured with spinneret orifices having a C shape and/or kidney bean shape that facilitates the formation of filaments having the desired cross-sectional shapes.

The spinneret orifices can further be configured to have a variety of different dimensions (e.g., different diameters) that facilitate formation of filaments having different thicknesses and deniers.

After formation of the polyester fibers with the selected cross-sectional shapes that are elongated (e.g., C-shapes and/or kidney bean shapes), a suitable cutting mechanism, e.g., a cutter reel, can be utilized at 220 to cut the extruded filaments into a variety of different staple lengths. In particular, as noted above, a cutter reel can be designed and configured to form groups of staple fibers having different lengths ranging from about 0.25 inch to about 2.00 inches or greater.

The groups of staple fibers having similar cross-sectional shapes and variable deniers can be combined in any suitable manner, and utilizing any one or more suitable yarn spinning machines, to form yarns at 230. Any suitable types of yarns can be formed by any suitable yarn spinning processes including, without limitation, siro spinning, vortex spinning, open end spinning, etc. Examples of polyester staple yarns that can be formed include siro yarns, combed yarns and/or ring spun yarns (e.g., CPRS yarns).

Staple yarns can also be formed that include combinations of polyester staple fibers and cotton (e.g., blended polyester/cotton yarns, such as CVC yarns).

At 240, the formed yarns are then combined in any suitable manner (e.g., knitting, weaving, etc.) to form fabrics that simulate pima cotton fabrics.

In example embodiments, a pima cotton simulated fabric is formed with yarns formed from polyester staple fibers and/or combinations or blends of polyester staple fibers and cotton fibers, where different groups of yarns and/or fibers are provided having different fibers lengths and/or different deniers (measured as denier per filament).

In further example embodiments, fabrics can be formed with different groups of polyester staple fibers and/or yarns formed of such staple fibers, where a first group can include polyester fibers having a fiber length of 1 inch or less that forms less than 50% of the total fibers within the fabric material, while a second group includes polyester fibers having a fiber length of greater than 1 inch and that forms greater than 50% of the total fibers within the fabric material. In still further example embodiments, fabric materials that simulate cotton fabrics can be formed using polyester staple fibers and/or polyester yarns including staple fibers having the lengths specified above.

The mass density and/or thickness of the polyester staple fibers formed (measured, e.g., based upon fiber denier) can also be varied independently of the fiber length and/or dependent upon the fiber length. For example, the fibers in the different groups of fiber lengths as set forth in Table 1 can also vary in denier per filament (DPF), where the DPF can be varied for fibers in a range from about 0.5 to about 2.0 (e.g., from about 1.0 to about 1.5). In other words, each group of fibers of a set length can vary in thickness and/or denier.

Thus, by varying parameters such as fiber cross-sectional shapes, fiber lengths and fiber thicknesses and/or deniers during formation of polyester staple fibers, fabric materials formed from yarns that include such polyester staple fibers can be formed having properties that resemble cotton fabrics.

One formed, the resulting yarn may be manipulated to form a textile or fabric that is incorporated into an article of apparel such as a shirt. The textiles may be produced through various production methods, including nonwoven processes, knitting processes, and weaving processes. Nonwoven textiles are webs of filaments or fibers connected via bonding, fusing, or interlocking. Knit textiles include consecutive rows of loops of filaments or fibers, called stitches. As each row progresses, a new loop is pulled through an existing loop. Woven textiles include a set of lengthwise threads (called the warp) interlaced with a set of crossing threads (called the weft). Knitted textiles are loose, including spaces between the loops that permit air to pass therethrough. Accordingly, the knitting process forms a highly breathable fabric. In contrast, woven textiles, while strong and durable, are dense and tight.

The textile may further include an activated or functional print applied to one or more surfaces. Activated or functional prints are prints containing compounds that interact with the user or the heat generated by the user to insulate, absorb heat, generate and direct IR rays back to the user and/or control skin or air temperature surrounding the body. In an example, ceramic materials capable of interacting with body heat are utilized. These ceramic materials include ceramic oxide materials and non-oxide ceramic materials including, without limitation, silicon oxides or silica (e.g., $SiO_2$), zirconium oxides (e.g., $ZrO_2$), titanium oxides (e.g., $TiO_2$), aluminum oxides (e.g., $Al_2O_3$), magnesium oxides (e.g., MgO), yttrium oxide ($Y_2O_3$), zirconium carbide (ZrC), and titanium carbide (TiC), and combinations thereof. In a further example, selected ceramic materials described above are capable of absorbing heat energy radiated by the user and using the heat to generate IR radiation (e.g., far IR radiation) that is directed back toward the user. These materials are known as bioceramic materials.

A functional print can be applied as a layer onto a surface of a fabric in any suitable manner. In an example embodiment, the functional materials of the print are incorporated into an ink composition that is printed onto the fabric. For example, a bioceramic composition includes a bioceramic material (described above) and a binder effective to disperse the components and/or to adhere the temperature reactive components to a substrate (e.g., to the yarns/fibers forming the substrate). The binder may be an elastomeric material possessing good elongation and tensile strength properties. Elastomeric materials typically have chains with high flexibility and low intermolecular interactions and either physical or chemical crosslinks to prevent flow of chains past one another when a material is stressed. In an embodiment, polyurethane (e.g., thermoplastic polyurethane such as polyester-based polyurethane) is utilized as the binder. In other embodiments, block copolymers with hard and soft segments may be utilized. For example, styrenic block copolymers such as a styrene-ethylene/butylene-styrene (SEBS) block copolymer may be utilized.

In an ink form, the amount of bioceramic material within the ink can range from about 2% by weight to about 50% or greater by weight. For example, the amount of bioceramic material within the bioceramic ink can be in an amount of at least about 2% by weight, by at least about 5% by weight, by at least about 25% by weight, by at least about 30% by weight, but at least about 40% by weight, or by no greater than about 50% by weight. In another example, the amount of bioceramic material within the bioceramic ink can be in an amount of about 5% by weight to about 15% by weight, or from about 8% by weight to about 12% by weight (e.g., about 10% by weight).

The bioceramic composition is applied to the substrate in a manner that maintains the integrity of the components and preserves properties of the substrate (the textile or fabric). In an embodiment, the bioceramic composition transferred to the substrate via printing process. By way of example, the composition is transferred to the textile or substrate via a rotogravure apparatus including an impression roller, a gravure or etched cylinder, and a tank. The cylinder is engraved/etched with recessed surface cells in a desired pattern. The tank holds the bioceramic composition. The apparatus further includes a doctor blade operable to remove excess composition from the cylinder. In operation, as the cylinder rotates, a portion of the cylinder becomes immersed in the bioceramic composition stored in the tank. The composition coats the cylinder, becoming captured within the cells. The cylinder continues to rotate, moving the coated cylinder past the doctor blade, which removes excess composition from the cylinder. The textile is directed between the impression roller and the cylinder such that the inner surface of the substrate (e.g., what will be the wearer-facing side of the apparel) contacts the cylinder. Specifically, the impression roller applies force to the substrate, pressing the textile onto the cylinder, thereby ensuring even and maximum coverage of the bioceramic composition. Surface tension forces pull the composition out of the cells, transferring it to the substrate. Once the composition is transferred, the coated textile may pass through one or more heaters to evaporate the solvent, thereby drying the composition and forming the dry print layer.

The process parameters of the printing process can be selectively controlled so as to achieve a desired printed pattern of bioceramic material on the fabric surface in any suitable amount. For example, surface coverage by the ceramic ink can be from about 5% to about 90% of the total surface area, such as about 20% to about 80% of the total surface area, or about 30% to about 60% of the total surface area, or 50% or greater of the total surface area (or 50% or less of the total surface area). Further, the bioceramic material can be applied at any suitable thicknesses so as to achieve a desired amount of bioceramic material within a given area. For example, surface coverage can be achieved that is from about 0.5 g/yd$^2$ (square yard) to about 30 g/yd$^2$, such as from about 2 g/yd$^2$ to about 4 g/yd$^2$, from about 4 g/yd$^2$ to about 8 g/yd$^2$, from about 4 g/yd$^2$ to about 6 g/yd$^2$, or from about 6 g/yd$^2$ to about 8 g/yd$^2$.

The process parameters of the printing process can be selectively controlled so as to achieve a desired printed pattern of bioceramic material on the fabric surface in any suitable amount. For example, surface coverage by the ceramic ink can be from about 5% to about 90% of the total surface area, such as about 20% to about 80% of the total surface area, or about 30% to about 60% of the total surface area, or 50% or greater of the total surface area (or 50% or less of the total surface area). Further, the bioceramic material can be applied at any suitable thicknesses so as to achieve a desired amount of bioceramic material within a given area. For example, surface coverage can be achieved that is from about 0.5 g/yd$^2$ (square yard) to about 30 g/yd$^2$, such as from about 2 g/yd$^2$ to about 4 g/yd$^2$, from about 4 g/yd$^2$ to about 8 g/yd$^2$, from about 4 g/yd$^2$ to about 6 g/yd$^2$, or from about 6 g/yd$^2$ to about 8 g/yd$^2$.

Figure 3:
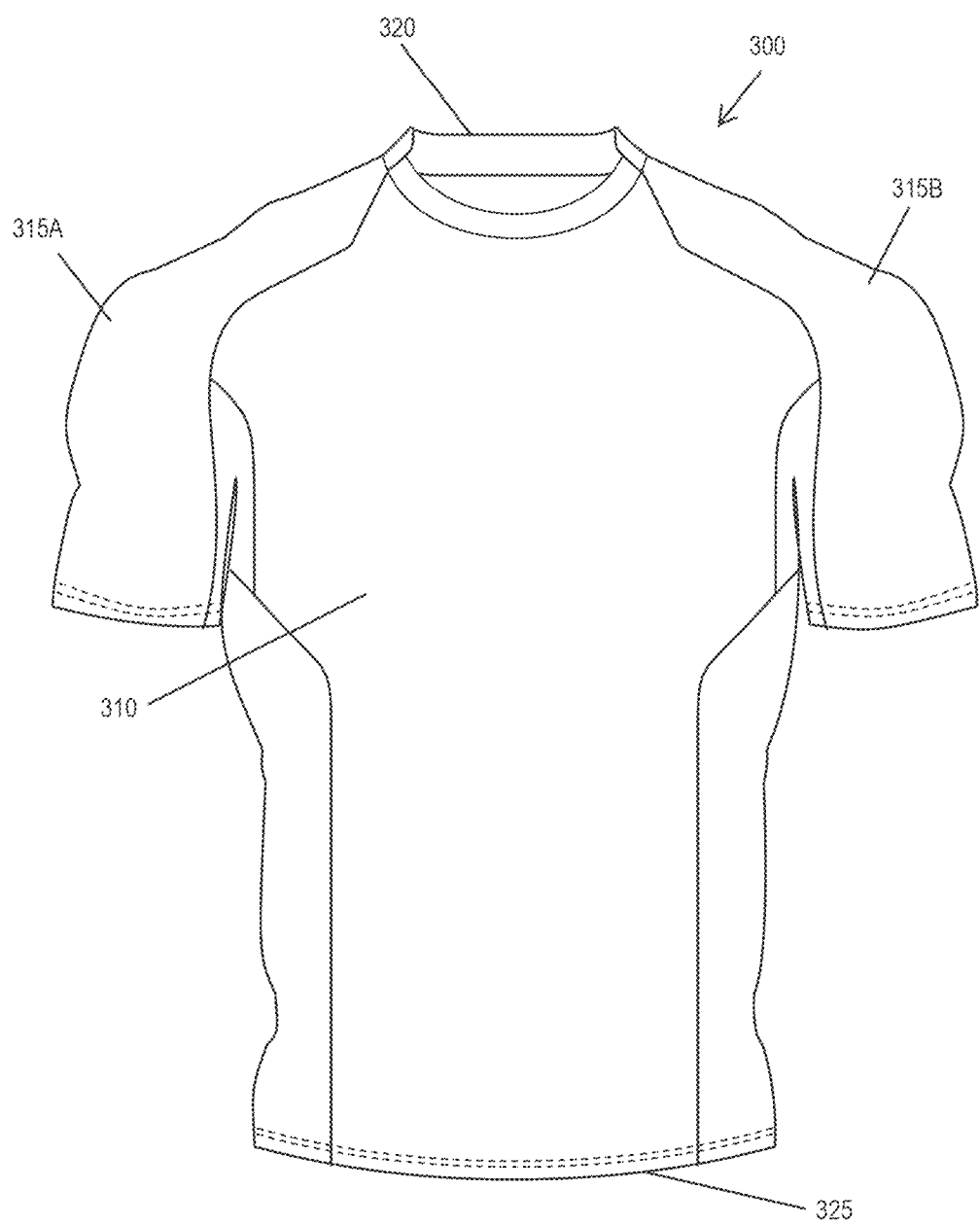
FIG. 3 illustrates an article of apparel in accordance with an embodiment of the invention.

Referring to FIG. 3, the article of apparel 300 may be in the form of a short-sleeved shirt including a torso portion 310, arm sleeves 315A, 315B, an upper neck opening 320, and a lower waist opening 325. Tubular knit fabrics are fabrics that are knit in the desired three-dimensional configuration as opposed to two-dimensional fabrics that are cut, sewn and otherwise manipulated to create a three-dimensional configuration. It should be understood, however, that the article of apparel 300 may have the configuration of other tubular garments, including various short or long-sleeved shirts, tank tops, undershirts, jackets, or coats; pants, trousers or shorts; socks, nylons or other leggings; dresses or skirts; hats and other headgear; etc.

While the invention has been described in detail and with reference to specific embodiments thereof, it will be apparent to one skilled in the art that various changes and modifications can be made therein without departing from the spirit and scope thereof.

It is further intended that the present invention covers the modifications and variations of this invention provided they come within the scope of the appended claims and their equivalents. It is to be understood that terms such as "top," "bottom," "front," "rear," "side," "height," "length," "width," "upper," "lower," "interior," "exterior," "medial," "lateral," and the like as may be used herein, merely describe points of reference and do not limit the present invention to any particular orientation or configuration.

What is claimed:

1. A method of forming a shirt from a textile material, the method comprising:
    forming a first filament having an irregular cross-section, the first filament possessing a first denier;
    forming a second filament having the irregular cross-section, the second filament possessing a second denier;
    cutting each of the first filament and the second filament into a plurality of fibers;
    spinning the fibers into yarns comprising the first and second filaments;
    forming a textile from yarns including the yarns comprising the first and second filaments; and
    forming a shirt with the textile;
    wherein the irregular filament cross-section comprises:
        a first bulbous end portion;
        a second bulbous end portion opposite the first bulbous end portion;
        a first exterior curved portion extending between the first bulbous end portion and the second bulbous end portion, the first exterior curved portion possessing a first length;
        a second exterior curved portion extending between the first bulbous end portion and the second bulbous end portion, the second exterior curved portion possessing a second length, the first length of the first exterior curved portion being greater than the second length of the second exterior curved portion; and
        a continuous interior wall defining an interior opening within the filament that is disposed between the first exterior curved portion and the second exterior curved portion.

2. The method according to claim 1, wherein each of the first denier and second denier is from about 0.5 dpf to about 2.0 dpf.

3. The method according to claim 2, wherein the method further comprises forming a third filament having the irregular cross section, the third filament possessing a third denier from about 0.5 dpf to about 2.0 dpf.

4. The method according to claim 3, wherein:
    the first denier is 0.95-1.05 dpf;
    the second denier is 1.15-1.25 dpf; and
    the third denier is 1.3-1.7 dpf.

5. The method according to claim 1, wherein forming the first filament comprises extruding the first filament through a first orifice of a spinneret to provide the first filament with the irregular cross-sectional shape and the first denier.

6. The method according to claim 5, wherein forming the second filament comprises extruding the second filament through a second orifice of a spinneret to provide the second filament with the irregular cross-sectional shape and the second denier.

7. The method according to claim 6 further comprising:
cutting the first filament into a first plurality of fibers; and
cutting the second filament into a second plurality of fibers; and
spinning the first plurality of fibers with the second plurality of fibers to form the yarns comprising the first and second filaments.

8. The method according to claim 7, wherein the first plurality of fibers constitutes over 50% of the fibers within the yarns comprising the first and second filaments.

9. The method according to claim 8, wherein the first denier is greater than the second denier.

10. The method according to claim 8, wherein the first denier is less than the second denier.

11. The method according to claim 1, wherein the textile is formed via knitting.

12. The method according to claim 1 further comprising applying a functional print layer to the textile.

13. The method according to claim 12, wherein the functional print layer comprises a bioceramic material.

14. The method according to claim 13, wherein the functional print layer is applied via rotogravure.

15. The method according to claim 1, wherein the article of apparel is a shirt comprising a torso portion, arm sleeves and a neck opening.

* * * * *